US006192676B1

(12) United States Patent
Zürbig et al.

(10) Patent No.: US 6,192,676 B1
(45) Date of Patent: Feb. 27, 2001

(54) DEVICE FOR REDUCING THE $NO_x$ CONTENT IN THE EXHAUST GAS OF AN INTERNAL COMBUSTION ENGINE

(75) Inventors: Jürgen Zürbig, Burgkunstadt; Reinhard Latsch, Sinsheim; Winfried Dölling, Weissenbrunn; Rainer Tost, Nürnberg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/257,110

(22) Filed: Feb. 25, 1999

(30) Foreign Application Priority Data

Feb. 25, 1998 (DE) .............................. 198 07 935

(51) Int. Cl.$^7$ ...................................................... F01N 3/00
(52) U.S. Cl. .............................. 60/286; 60/301; 60/303; 60/276; 60/291; 422/105; 423/213.2
(58) Field of Search ............................. 60/286, 301, 303, 60/274, 276, 291; 422/105; 423/213.2

(56) References Cited

U.S. PATENT DOCUMENTS

| 5,369,956 | * | 12/1994 | Daudel et al. | 60/276 |
| 5,410,873 | * | 5/1995 | Tashiro | 60/276 |
| 5,540,047 | * | 7/1996 | Dahlheim et al. | 60/274 |
| 5,628,186 | * | 5/1997 | Schmelz | 60/274 |
| 5,643,536 | * | 7/1997 | Schmelz | 422/105 |
| 5,778,667 | * | 7/1998 | Kinugasa et al. | 60/274 |
| 5,785,937 | * | 7/1998 | Neufert et al. | 423/213.2 |
| 5,950,422 | * | 9/1999 | Dolling | 60/274 |

FOREIGN PATENT DOCUMENTS

| 4315278A1 | 11/1994 | (DE) . |
| 4334071C1 | 2/1995 | (DE) . |
| 4432576A1 | 3/1996 | (DE) . |
| 4432577A1 | 3/1996 | (DE) . |
| 196 37 032A1 | 3/1998 | (DE) . |

OTHER PUBLICATIONS

"A Controlled Exhaust Gas Aftertreatment System to Fulfill Future Emissions Limits for Passenger Car Diesel Engines", Detlev Schöppe et al., , 17$^{th}$ International Wiener Motorensymposium, 1996, vol. 1, pp. 332–353.

* cited by examiner

Primary Examiner—Thomas Denion
(74) Attorney, Agent, or Firm—Herbert L. Lerner; Laurence A. Greenberg; Werner H. Stemer

(57) ABSTRACT

A completely self-contained device reduces the $NO_x$ content in the exhaust gas of an internal combustion engine operated with excess air. One or more reduction catalytic converters working according to the SCR principle are provided. A reducing agent control unit need not make any recourse to data present in the control unit of the internal combustion engine. Fitting and retrofitting to a vehicle is greatly simplified, particularly for vehicles that are already in use.

24 Claims, 2 Drawing Sheets

DEVICE FOR REDUCING THE NO$_x$ CONTENT IN THE EXHAUST GAS OF AN INTERNAL COMBUSTION ENGINE

BACKGROUND OF THE INVENTION

Field of the Invention

The invention relates to a device for NO$_x$ reduction in the exhaust gas of an internal combustion engine operated with excess air. The engine is controlled with a control unit. The device includes a reduction catalytic converter that works according to the so-called SCR principle in the exhaust system. A reducing agent metering system has a reducing agent injection valve upstream of the reduction catalytic converter in the exhaust system. The reducing agent is metered in on the basis of catalytic converter operating parameters and the exhaust gas composition.

The so-called selective catalytic reduction (SCR) method is known for reducing the NO$_x$ content in the exhaust gas of an internal combustion engine operated with excess air. A reducing agent is thereby injected into the exhaust gas at a point upstream of a catalytic converter (in terms of the exhaust gas flow direction), and the NO$_x$ contained in the exhaust gas is thus reduced in a reduction catalytic converter to form nitrogen gas N$_2$. In this regard, reference may be made to the publication by Schöppe et al., "Ein geregeltes Abgasnachbehandlungssystem zur Erfüllung zukünftiger Emissionsgrenzwerte bei PKW-Dieselmotoren" [A controlled exhaust gas post-treatment system for meeting future emission restrictions in automobile diesel engines], 17th International Wiener Motorensymposium, 1996, Vol. 1. Ammonia can serve as the reducing agent, although for reasons of convenience it is customary to use an aqueous urea solution or powdered urea. It is also known to employ fuel or derivatives as the reducing agent.

In the known SCR system, the target quantity for the reducing agent metering is calculated continuously by the control unit of the internal combustion engine. For this, the control unit needs the instantaneous reducing agent demand. This is calculated from operating parameters of the internal combustion engine, such as mass of air, operating temperature or load. Together with the catalytic converter temperature, these values form the basis for metering the reducing agent. NO$_x$ reduction using the SCR system allows reduction rates in excess of 60%, but presupposes the determination of individual emission characteristics for the internal combustion engines, which have to be stored in a control unit in order to control the metering.

The NO$_x$ reduction therefore requires significant equipment outlay with extensive data interchange between the control unit of the internal combustion engine and the reducing agent metering system. It has to date been possible only with great outlay to retrofit vehicles which are already being used and have internal combustion engines operated with excess air, with an exhaust gas post-treatment system based on the SCR principle, or to equip internal combustion engines originally developed without NO$_x$ reducing exhaust gas treatment with SCR catalysts.

SUMMARY OF THE INVENTION

It is accordingly an object of the invention to provide a simplified device for reducing the NO$_x$ content in the exhaust gas of a vehicle internal combustion engine operated with excess air, which overcomes the above-mentioned disadvantages of the heretofore-known devices and methods of this general type and which makes it possible to use catalytic converters working on the basis of the SCR principle without the outlay on conventional devices, and in particular makes it possible to retrofit vehicles already available with acceptable outlay.

With the foregoing and other objects in view there is provided, in accordance with the invention, a device for reducing a NO$_x$ content in exhaust gas of a vehicle internal combustion engine, wherein a control unit is provided and the engine is operated with excess air, the device comprising:

an exhaust system conducting an exhaust gas flow in an exhaust gas flow direction;

an SCR catalytic converter disposed in the exhaust system;

a reducing agent metering system including:

a source of reducing agent and a reducing agent injection valve communicating with the source of reducing agent, the injection valve being disposed to inject reducing agent into the exhaust system upstream of the SCR catalytic converter in the exhaust gas flow direction;

a temperature sensor, an NO$_x$ measuring sensor, and an exhaust gas flow sensor connected to the exhaust system;

a reducing agent control unit directly connected to the temperature sensor, to the NO$_x$ measuring sensor, and to the exhaust gas flow sensor;

the reducing agent control unit determining an amount of reducing agent to be injected, from measurements of the temperature sensor, the NO$_x$ measuring sensor, and the exhaust gas flow sensor without recourse to data available in the control unit of the internal combustion engine, and driving the reducing agent metering system and metering the reducing agent based on the measurement.

The novel device is a self-contained unit. The metering of the reducing agent is no longer carried out with recourse to data present in the control unit of the internal combustion engine, but is derived from the signals of a volume flow sensor, a temperature measuring sensor and an NO$_x$ measuring sensor. To this end, a generally simplified NO$_x$ characteristic is stored in the reducing agent control unit. It is possible to do without test rig calibration for determining emission characteristics individual to the internal combustion engines. To configure the device when retrofitting, only the maximum volume throughput and the maximum permissible exhaust gas back pressure on the internal combustion engine need to be taken into account. The simple structure of the overall system, by reducing the sensing hardware to the components exhaust gas temperature measuring sensor, or catalytic converter temperature measuring sensor, NO$_x$ measuring sensor and volume flow measuring sensor, make it possible to fit almost all the components directly to the SCR system, by means of which the previous elaborate wiring may be omitted.

In accordance with an added feature of the invention, urea is used as the reducing agent and the source of reducing agent includes a storage container and a pump for pumping the urea from the storage container to the injection valve.

In accordance with an additional feature of the invention, the reducing agent control unit is mounted on the storage container.

In a preferred configuration of this embodiment, a further measuring sensor is provided, which is sensitive to NH$_3$ as a component of the exhaust gas. It is, however, also possible to provide an NO$_x$ measuring sensor which is sensitive to NH$_3$ as a function of the operating temperature. The reducing agent control unit continues to meter urea until a predetermined maximum $NH_3$ content is indicated by the measuring sensor.

In accordance with an alternative feature of the invention, fuel is used as the reducing agent and the reducing agent metering system communicates with the fuel supply of the internal combustion engine, for feeding fuel to the reducing agent injection valve. The reducing agent metering system delivers the fuel to the reducing agent injection valve from a connection to the fuel supply of the internal combustion engine. In a preferred configuration of this embodiment, a further measuring sensor is provided which is sensitive to HC as a component of the exhaust gas. It is also possible to use an $NO_x$ measuring sensor which is sensitive to HC as a function of the operating temperature.

In accordance with another feature of the invention, the exhaust gas flow sensor is a volume flow measuring sensor disposed in the exhaust system for measuring an exhaust gas volume flow rate.

In accordance with a further feature of the invention, the exhaust gas flow sensor is a pressure sensor disposed upstream of the SCR catalytic converter for measuring a exhaust gas back pressure in front of the SCR catalytic converter, as a measure of an exhaust gas volume flow rate.

In accordance with various further embodiments of the invention, the exhaust gas flow sensor is formed of a plurality of pressure sensors recording a pressure drop in the reduction catalytic converter as a measure of an exhaust gas volume flow rate. A further exhaust gas measuring sensor is sensitive to a further exhaust gas component, and the reducing agent control unit is directly connected to the further exhaust gas measuring sensor.

In other words, the volume flow measuring sensor may, in one preferred configuration of the invention, be an exhaust gas volume flow measuring sensor upstream of the reduction catalytic converter. Such an exhaust gas volume flow measuring sensor may be constructed in the form of a grid structure and additionally be used to produce turbulence which contributes to the mixing of the exhaust gas with the reducing agent injected upstream. It is also possible to arrange the exhaust gas volume flow measuring sensor downstream of the catalytic converter. In a further embodiment, a volume flow measuring sensor is provided in the intake system of the diesel internal combustion engine and the intake air volume flow rate serves as a measure of the exhaust gas volume flow rate. In a further embodiment of the device according to the invention, one or more pressure sensors are provided at the reduction catalytic converter, so that the pressure drop or the exhaust gas back pressure at the reduction catalytic converter serves as a measure of the exhaust gas volume flow rate.

In accordance with again an added feature of the invention, an engine speed sensor (rpm sensor) may be connected to the reducing agent control unit, and wherein the reducing agent control unit uses a measurement of the engine speed sensor to monitor a function of the exhaust gas flow sensor. The reducing agent control unit can estimate the exhaust gas volume flow rate from the signal of the rotational speed sensor and, using this value, check the signal of the exhaust gas volume flow sensor. It is thus possible to diagnose a faulty exhaust gas volume flow measuring sensor. In a preferred configuration of this embodiment, the rotational speed sensor is an inductive sensor which produces its operating voltage internally from the induction voltage, transmits the rotational speed information wirelessly to the reducing agent control unit and therefore requires no electrical connection to the vehicle.

The SCR catalytic converter may be fitted in the exhaust system, for example instead of a front muffler. If urea is employed as the reducing agent, the hydrolysis of the urea may take place in a hydrolysis catalytic converter connected upstream of the reduction catalytic converter. It is, however, also possible to inject the urea into the exhaust system upstream of the reduction catalytic converter, so that the hydrolysis takes place fully or partially in the hot exhaust gas.

In accordance with a concomitant feature of the invention, the SCR reduction catalytic converter consists of a plurality of catalytic converter units connected in series, and the $NO_x$ measuring sensor, which may also be sensitive to $NH_3$ or HC as a function of the operating temperature, is arranged upstream of the last catalytic converter unit. The reducing agent is metered by the reducing agent control unit in such a way that a measurement dependent on the conversion capacity of the last catalytic converter unit, connected downstream of the measuring sensor, is obtained.

Other features which are considered as characteristic for the invention are set forth in the appended claims.

Although the invention is illustrated and described herein as embodied in a device for reducing the $NO_x$ content in the exhaust gas of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
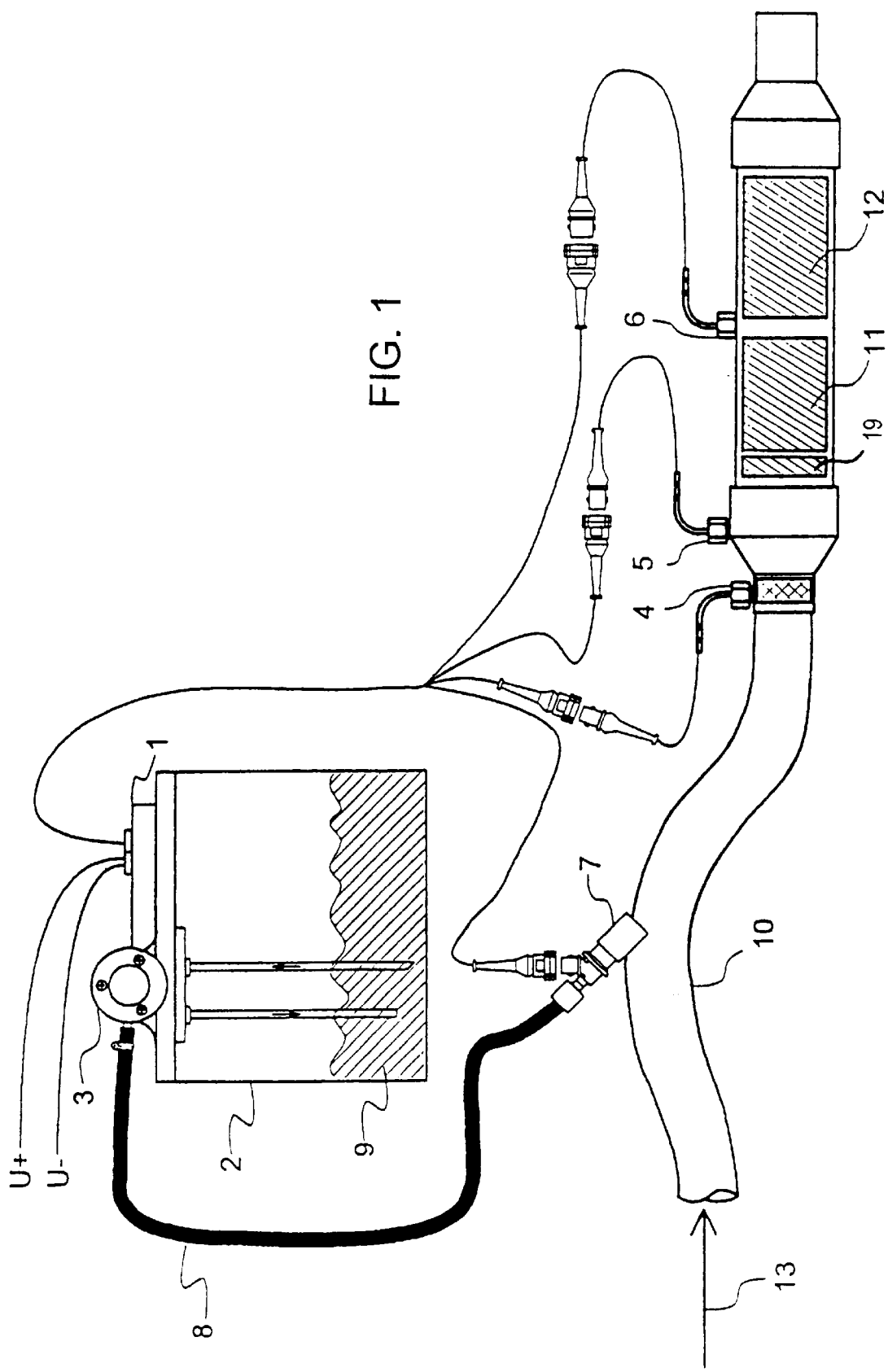
FIG. 1 is a partly schematic diagram illustrating a first embodiment of the novel system.

Referring now in detail to the sole figure of the drawing the SCR system includes a reducing agent control unit 1 which is allocated a urea storage container 2 with a pump 3. An exhaust gas volume flow measuring sensor 4, a temperature measuring sensor 5, which records the temperature of the catalytic converter or of the exhaust gas, and an $NO_x$ measuring sensor 6 are connected to the reducing agent control unit 1 via corresponding signal lines. The reducing agent control unit 1 drives a reducing agent injection valve 7 which is fed urea 9 from the urea storage container 2 via a hose 8. The reducing agent injection from the reducing agent injection valve 7 takes place in the exhaust system 10 of a diesel internal combustion engine. Downstream of the reducing agent injection valve 7 (in the exhaust gas flow direction) are the exhaust gas volume flow measuring sensor 4, the temperature measuring sensor 5 and two SCR catalytic converters 11 and 12. A measuring sensor 6 is arranged between the catalytic converter 11 and 12 which is sensitive to $NO_x$ below a certain temperature and is sensitive to $NH_3$ above it.

The reducing agent control unit 1 is connected to the positive battery voltage U+ and the negative battery voltage U− of the vehicle. When the non-illustrated diesel internal combustion engine is running, which is detected by the signal of the exhaust gas volume flow measuring sensor 4 or may be communicated to the reducing agent control unit 1 via an additional line, the exhaust gas flows in the direction of the arrow 13. On the basis of the measurements for exhaust gas/catalytic converter temperature, the exhaust gas volume flow rate and $NO_x$ content, the reducing agent control unit 1 calculates the amount of urea 9 to be injected via the pump 3 and the reducing agent injection valve 7. When the urea is injected into the exhaust system 10, the urea is hydrolyzed and further mixed by the grid structure of the exhaust gas volume flow sensor 4. In the catalytic converters 11 and 12, the $NO_x$ in the exhaust gas is catalytically reduced to form $N_2$.

The components incorporated in the exhaust system of the internal combustion engine, the exhaust gas volume flow measuring sensor 4, the temperature measuring sensor 5, the catalytic converters 11 and 12 and the $NO_x$ measuring sensor 6 are only to be configured in terms of maximum exhaust gas throughput and maximum permissible exhaust gas back pressure on the internal combustion engine. This makes it possible to fit the device instead of a front muffler when retrofitting vehicles already available. It is further possible to equip internal combustion engines originally manufactured without an $NO_x$ reduction system with the SCR system according to the invention.

Figure 2:
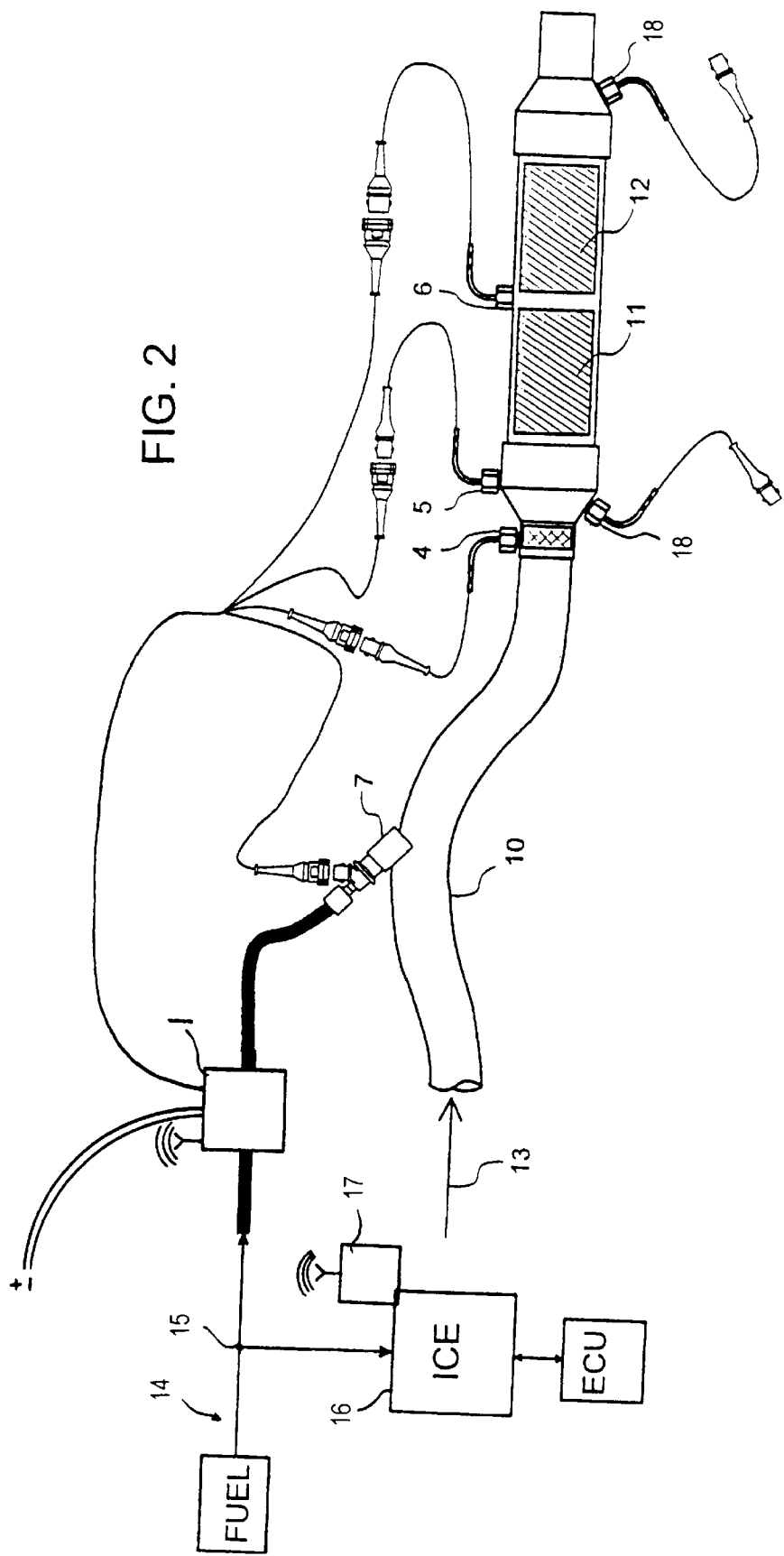
FIG. 2 is a similar view of second embodiment, illustrated with various modifications.

Referring now to FIG. 2, there are shown various modifications of the novel system. It should be understood that several of the modifications may be used in connection with the embodiment of FIG. 1 as well. The primary difference between FIGS. 1 and 2 is that the latter shows the use of fuel to reduce the $NO_x$ content in the exhaust gas 13. The fuel supply system 14 of the internal combustion engine 16 is tapped at a point 15. Since the novel device pertains to reducing nitrous oxides in the exhaust gas of the engine operated with excess air, the reduction may be effected by injecting fuel into the exhaust gas upstream of the catalytic converters 11, 12. An rpm sensor 17 or engine speed sensor 17 is directly connected at the engine 16. In order to avoid having to run an electrical cable or wire from the sensor 17 to the control unit 1, the connection is effected by wireless communication. This is indicated by the antennas on the sensor 17 and the control unit 1, respectively. In addition, the speed sensor 17 is an inductive sensor so that its operating power (the operating voltage) is generated from the induction voltage. Any electrical harness connection of the sensor is thus obviated.

The exhaust gas volume flow rate may be measured by one or more pressure sensors 18. In a first embodiment, a pressure sensor 18 is disposed upstream, just in front of the first catalytic converter 11. The sensor 18 measures the exhaust gas back pressure at the catalytic converter 11. The back pressure measurement provides a measure of the volume flow rate. In the alternative, a plurality of pressure sensors may be provided which measure the pressure drop in the SCR catalytic converter 11, 12. The pressure drop represents a measure of the exhaust gas volume flow.

Returning once more to the embodiment illustrated in FIG. 1, with urea being used as the reducing agent, it is advantageous for the urea to be hydrolyzed prior to entering the SCR catalytic converter 11. For that purpose, in order to hydrolyze the urea 9, the reducing agent injection valve 7 injects the urea 9 into a hydrolysis catalytic converter 19 connected in front of the reduction catalytic converter 11. In the alternative, the urea may also be hydrolyzed simply by its injection into the hot exhaust system.

We claim:

1. A device for reducing a $NO_x$ content in exhaust gas of a vehicle internal combustion engine, wherein a control unit is provided and the engine is operated with excess air, the device comprising:
    an exhaust system conducting an exhaust gas flow in an exhaust gas flow direction;
    an SCR catalytic converter disposed in said exhaust system;
    a reducing agent metering system including:
        a source of reducing agent and a reducing agent injection valve communicating with said source of reducing agent, said injection valve being disposed to inject reducing agent into said exhaust system upstream of said SCR catalytic converter in the exhaust gas flow direction;
        a temperature sensor, an $NO_x$ measuring sensor, and an exhaust gas flow sensor connected to said exhaust system;
        a reducing agent control unit directly connected to said temperature sensor, to said $NO_x$ measuring sensor, and to said exhaust gas flow sensor;
        said reducing agent control unit determining an amount of reducing agent to be injected, from measurements of said temperature sensor, said $NO_x$ measuring sensor, and said exhaust gas flow sensor without recourse to data available in the control unit of the internal combustion engine, and driving said reducing agent metering system and metering said reducing agent based on the measurement.

2. The device according to claim 1, wherein said reducing agent is urea and said source of reducing agent includes a storage container and a pump for pumping said urea from said storage container to said injection valve.

3. The device according to claim 2, wherein said reducing agent control unit is mounted on said storage container.

4. The device according to claim 1, wherein said reducing agent is fuel, and said reducing agent metering system communicates with a fuel supply of the internal combustion engine, for feeding fuel to said reducing agent injection valve.

5. The device according to claim 1, wherein said exhaust gas flow sensor is a volume flow measuring sensor disposed in said exhaust system for measuring an exhaust gas volume flow rate.

6. The device according to claim 1, wherein said exhaust gas flow sensor is a pressure sensor disposed upstream of said SCR catalytic converter for measuring a exhaust gas back pressure in front of said SCR catalytic converter, as a measure of an exhaust gas volume flow rate.

7. The device according to claim 1, wherein said exhaust gas flow sensor is formed of a plurality of pressure sensors recording a pressure drop in said SCR catalytic converter as a measure of an exhaust gas volume flow rate.

8. The device according to claim 1, which comprises a further exhaust gas measuring sensor sensitive to a further exhaust gas component, and said reducing agent control unit is directly connected to said further exhaust gas measuring sensor.

9. The device according to claim 8, wherein said further exhaust gas measuring sensor is sensitive to an exhaust gas component selected from the group consisting of $NH_3$ and HC.

10. The device according to claim 1, wherein said $NO_x$ measuring sensor is sensitive to $NH_3$ as a function of an operating temperature.

11. The device according to claim 1, wherein said $NO_x$ measuring sensor is sensitive to HC as a function of an operating temperature.

12. The device according to claim 1, which further comprises an engine speed sensor connected to said reducing agent control unit, and wherein said reducing agent control unit uses a measurement of said engine speed sensor to monitor a function of said exhaust gas flow sensor.

13. The device according to claim 11, wherein said engine speed sensor is an inductive sensor transmitting a signal corresponding to a rotational speed of the engine wirelessly to said reducing agent control unit, said engine speed sensor generating an operating voltage from an induction voltage and having no electrical connection to the vehicle.

14. The device according to claim 1, wherein said reducing agent is urea, and including a measuring sensor sensitive to $NH_3$ disposed in said reduction catalytic converter and said reducing agent control unit continuing to meter urea until a predetermined maximum $NH_3$ content is indicated.

15. The device according to claim 1, wherein the reducing agent control unit continues to meter the reducing agent until a predetermined minimum $NO_x$ content is displayed by the $N_x$ measuring sensor.

16. The device according to claim 1, wherein said SCR catalytic converter consists of at least two catalytic converter units connected in series and having a last catalytic converter unit, and said $NO_x$ measuring sensor is disposed upstream of said last catalytic converter unit.

17. The device according to claim 16, wherein a predetermined $NH_3$ or $NO_x$ content, respectively, depends on a conversion capacity of said last catalytic converter unit.

18. The device according to claim 1, wherein said reducing agent is urea, and including a hydrolysis catalytic converter connected upstream of said SCR catalytic converter, and wherein said reducing agent injection valve injects the urea into said hydrolysis catalytic converter for hydrolyzing the urea.

19. The device according to claim 1, wherein said reducing agent is urea, and said reducing agent injection valve is disposed to inject the urea into said exhaust system upstream of said SCR catalytic converter, whereby the urea is hydrolysed in said exhaust system.

20. The device according to claim 1, wherein the device is adjusted to the internal combustion engine only in terms of maximum throughput and back pressure of the exhaust gas, without a calibration on a test rig.

21. A kit for retrofitting a motor vehicle with an internal combustion engine originally developed without a $NO_x$ reducing exhaust gas treatment system, comprising the device according to claim 1 in the form of a closed unit.

22. The kit according to claim 21, wherein the exhaust gas system includes a forward muffler, and said closed unit is configured to replace the forward muffler.

23. A kit for retrofitting a $NO_x$ reducing exhaust gas treatment system of a motor vehicle with an internal combustion engine, comprising the device according to claim 1 in the form of a closed unit.

24. The kit according to claim 23, wherein the exhaust gas system includes a forward muffler, and said closed unit is configured to replace the forward muffler.

* * * * *